（12）United States Patent
Barrenscheen et al.

(10) Patent No.: US 8,964,779 B2
(45) Date of Patent: Feb. 24, 2015

(54) DEVICE AND METHOD FOR ELECTRONIC CONTROLLING (75) Inventors: Jens Barrenscheen, Munich (DE);
Harry Siebert, Puchheim (DE)

(73) Assignee: Infineon Technologies AG, Neubiberg (DE)

( * ) Notice: Subject to any disclaimer, the term of this patent is extended or adjusted under 35 U.S.C. 154(b) by 1477 days.

(21) Appl. No.: 11/948,454

(22) Filed: Nov. 30, 2007

(65) Prior Publication Data
US 2009/0144587 A1 Jun. 4, 2009

(51) Int. Cl.
*H04J 3/16* (2006.01)
*G05B 19/042* (2006.01)

(52) U.S. Cl.
CPC .. *G05B 19/0426* (2013.01); *G05B 2219/23188* (2013.01); *G05B 19/0421* (2013.01); *G05B 2219/2216* (2013.01); *G05B 2219/2637* (2013.01); *G05B 2219/25289* (2013.01)
USPC ............... 370/465; 701/1; 714/40; 713/330

(58) Field of Classification Search
USPC ............ 370/465; 701/1, 33, 87, 29, 48, 117; 710/105, 316, 67, 220; 714/40, 25; 713/330, 320; 711/114; 187/247–248; 323/355; 340/906
See application file for complete search history.

(56) References Cited

U.S. PATENT DOCUMENTS

| | | | | |
|---|---|---|---|---|
| 4,041,469 A * | 8/1977 | Jennings | | 710/67 |
| 5,357,064 A * | 10/1994 | Boyce et al. | | 187/247 |
| 5,522,080 A * | 5/1996 | Harney | | 710/220 |
| 5,778,332 A * | 7/1998 | Chang et al. | | 701/117 |
| 5,936,211 A * | 8/1999 | Kim | | 187/248 |
| 6,192,301 B1 * | 2/2001 | Park | | 701/29 |
| 6,266,726 B1 * | 7/2001 | Nixon et al. | | 710/105 |
| 6,587,950 B1 * | 7/2003 | Shah et al. | | 713/300 |
| 7,222,014 B2 * | 5/2007 | Tao et al. | | 701/87 |
| 7,493,198 B2 * | 2/2009 | Sonnenrein et al. | | 701/33 |
| 7,734,938 B2 * | 6/2010 | Kim | | 713/320 |
| 7,864,071 B2 * | 1/2011 | Bachelder et al. | | 340/906 |
| 2003/0149904 A1 * | 8/2003 | Kim | | 713/330 |
| 2003/0171865 A1 * | 9/2003 | Moser et al. | | 701/48 |
| 2004/0135569 A1 * | 7/2004 | Yun | | 323/355 |
| 2005/0228943 A1 * | 10/2005 | DeCenzo et al. | | 711/114 |
| 2007/0050096 A1 * | 3/2007 | Mattes et al. | | 701/1 |
| 2008/0077310 A1 * | 3/2008 | Murlidar et al. | | 701/117 |
| 2008/0126702 A1 * | 5/2008 | Zimoto et al. | | 711/114 |
| 2008/0276033 A1 * | 11/2008 | DeCenzo et al. | | 710/316 |
| 2008/0276042 A1 * | 11/2008 | Hetzler et al. | | 711/114 |
| 2012/0178491 A1 * | 7/2012 | Tsai | | 455/517 |

* cited by examiner

*Primary Examiner* — Vinncelas Louis
(74) *Attorney, Agent, or Firm* — Dicke, Billig & Czaja, PLLC (57) ABSTRACT

An electronic controlling device and method is disclosed. One embodiment provides at least one module performing specific functions within one of a plurality of module modes on reception of a corresponding module mode request. A system control unit is provided to operate the at least module in one of a plurality of module modes by distributing a corresponding system mode request. The at least one module is adapted to translate the distributed system mode request to a module mode request which is configurable.

18 Claims, 6 Drawing Sheets

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| BP COM | 0 | COMCFG | | BP SUM | 0 | SUMCFG | | BP NOM | 0 | NOMCFG | | 0 | | BP MOD EN | MOD EN |
| w | r | rw | | w | r | rw | | w | r | rw | | r | | w | rw |

Fig. 9

DEVICE AND METHOD FOR ELECTRONIC CONTROLLING

BACKGROUND

The present invention relates generally to an electronic controlling device, such as a microcontroller, as well as to methods for electronic controlling and for operating an electronic controlling device.

One of the challenging problems regarding electronic controlling devices, which may e.g., be used to control electrical devices in a vehicle, relates to the way various system modes are enabled in the functional modules of the electronic controlling device, in particular in the case when these system modes are supposed to have different priorities. Such system modes may include for instance debug modes, power saving modes, reset modes or any other predefined modes.

In current architectures of electronic controlling devices, the modules mostly include an input to receive a request signal which may cause a change in the behavior of the respective module, in one embodiment to suspend, "freeze" or automatically power down the module. That means that the triggering of the functions—typically through usage of an "enable bit"—is assigned to the respective module itself.

Hence, in order to change between various system modes in existing integrated microcontroller architectures, for each system mode, lines signaling the corresponding system mode requests have to be distributed to every single relevant module. Accordingly, the system mode requests are evaluated on a module by module basis.

This common solution to change between system modes—although appearing simple and straightforward at first sight—has one disadvantage that it causes an increased implementation effort when the microcontroller architecture needs to be redesigned, changed or when a new system mode has to established.

For these or other reasons, there is a need for the present invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

In the following, for illustration purposes, the invention will be described with reference to a microcontroller like, for instance, a general purpose integrated microcontroller. However, the invention is not so limited and may find its application in conjunction with any other type of electronic controlling unit that might be integrated into other devices.

The basic cause of the above described inflexibility of existing architectures of electronic controlling devices lies in the fact that—as a consequence of the evaluation of the system mode requests on a module by module basis—also a prioritization among concurrent system mode requests received by the modules needs to be carried out on a module by module basis.

Hence, when a change of the priorities among the system modes is required, the currently used local prioritization schemes will lead to an increased implementation effort. So far, in practice, designers balk at this implementation effort and rather accept the limited flexibility of the microcontroller functionality. Moreover, the local prioritization of concurrent system mode requests might lead to unnecessary processing operations, if a cluster of modules uses the same priority scheme.

Correspondingly, one or more embodiments carry out the prioritization among the system modes on a higher hierarchical—i.e. "system"—level of the microcontroller, which will more accurately reflect the characteristics of the "system" modes.

An electronic controlling device and/or a microcontroller and/or methods for electronic controlling and/or for operating an electronic controlling device are provided, substantially as illustrated in and/or described in connection with at least one of the figures, as set forth more completely in the claims.

Further features and advantages of the present invention will become apparent from the following detailed description of the invention made with reference to the accompanying drawings.

For different applications, it is necessary to operate electronic assemblies or boards in different system modes. Correspondingly, electronic devices for controlling these electronic assemblies or boards, e.g., microcontrollers, have to provide correspondingly different system modes as well.

In reaction to a change of a system mode according to a corresponding system mode request, the current consumption of the affected modules may be changed in a corresponding power saving mode or the access behavior of possibly other affected modules may change in a corresponding debug mode.

However, the effect of the changed system mode on different modules of the electronic controlling device may have to vary according to the intended application. For instance, in one application it may be necessary to suspend a communication interface of a specific module in a first debug case in order to analyze the behavior of this interface, while in another debug case, exactly this interface is used for the debug communication and thus has to remain active.

In still another application, a mechanism has to be provided to "wake-up" the electronic controlling device system from a power saving mode by providing corresponding input signals to the respective request inputs of the affected modules, or to power down these or other modules to further reduce the power consumption. Of course, the above application examples are just for illustration purposes and the present invention is not so limited.

Hence, in one or more embodiments the microcontroller is flexible and will accommodate a great variety of possible applications.

To analyze a way to increase the flexibility of an electronic controlling device in order to support the corresponding plurality of possible combinations of applications, it is helpful to express these combinations by a model of a multi-dimensional space of functions.

The first dimension of this space is constituted by the plurality of available system modes. With the elements of this dimension, namely the system modes, a change between these system modes is mainly determined by events which are unforeseeable over time, i.e. asynchronous.

These events are detected and/or processed by hardware and may therefore be independent from the software currently running on the electronic controlling device. Examples for these events are events which require the change between power modes, e.g., a low remaining battery capacity, and points in time during the transitions between these power modes, as well as debug accesses to the electronic controlling device via an independent entity, or sudden voltage drops.

A second dimension results from the functional range of each of the modules of an electronic controlling device, which altogether constitute the electronic controlling device system. The functional range may e.g., include the normal operation of the electronic controlling device and the controlled device, or a break at a point between commands or operations which is safe for the electronic controlling device system. For example for a CAN (Control Area Network) module, such a safe point could be defined by the completion of the transmission of a CAN message since, the CAN message could otherwise block the whole corresponding CAN bus.

A further example of the functional range of the modules is the systematic entering of a defined state also for the controlled device. For instance, for an electronic controlling device including a pulse width modulation unit for controlling of electric motors, such a defined state could be to drive the outputs into an idle position in order to prevent damages of the system. A still further example of the functional range of the modules may be an instant break without any further operations (e.g., for timers).

A third dimension of the multi-dimensional space of functions is constituted by the various applications of the electronic controlling device system. This element in the model of the electronic controlling device reflects that not all of the modules in an electronic controlling device system are supposed to illustrate the same reaction in the different system modes.

A hard, i.e. definitely and unchangeably defined mapping of a module reaction to a system mode would limit the flexibility of the electronic controlling device system, since this hard mapping might not cover some of the clients demands with respect to module reaction in a certain system mode.

As an example for the above, the electronic controlling device may be used in one application wherein it may communicate over an asynchronous interface via RS232 with a debugger. In this application the asynchronous interface must not be shut off if the electronic controlling device system is switched to a suspend mode by the debugger.

However in another application of the electronic controlling device, the same asynchronous interface has to be suspended immediately in order to check the current state of the interface including the content of the data buffers of the interface, while the communication with the debugger proceeds over another interface.

Another example for the increased flexibility without an unchangeable mapping of a module reaction to a system mode may be a first module reaction in a first application wherein an interface is used in order to save data to a memory in case an imminent voltage breakdown is signaled.

However, for the affected module to be flexible, there should be the possibility to define a second module reaction for a second application. In this second application, in the same case of an imminent voltage breakdown, i.e. in the same system mode, the interface is switched off automatically in order to save as much power as possible if saving the data is not necessary.

In embodiments of an electronic controlling device, a clear separation of the above described dimensions is provided. Therefore, each of the dimensions or functions is represented on a separate hierarchical level where it causes the least amount of effort to be implemented or where it offers the greatest amount of flexibility.

Hence, in the described embodiment of an electronic controlling device the architecture of the electronic controlling device is configured to provide a clear separation between the request of a system mode, i.e. the first dimension of the abstract hierarchy model of an electronic controlling device, and reaction of the modules of the electronic controlling device, i.e. the second dimension of the model.

This causes that the request of applying or changing of the system mode of the electronic controlling device may be prioritized and processed more centrally, i.e. on a higher hierarchical level. The result of this prioritization is a decision which system mode is actually to be applied. This decision may then be distributed throughout the system to the modules. In the words of the abstract hierarchy model of an electronic controlling device, the corresponding centralized prioritization units provide the separated first dimension.

In a further embodiment, the modules are configured to enable definitions of certain functions on a module specific basis. These functions include e.g., the normal operation of the electronic controlling device and the controlled device or the acquisition of defined states, wherein the defined states cause a reasonable system behavior according to the respective application.

For the already mentioned example of an electronic controlling device including a pulse width modulation unit for controlling of electric motors such a defined state could be the idle position at the beginning of a pulse width modulation period, the systematic switching on or off of the pulse width modulated outputs or an instant "freezing" of the outputs, i.e. the suspension of any further influence on the pulse width modulated outputs.

Hence, in the words of the abstract hierarchy model of an electronic controlling device, the configurability of the functions of the modules, which is independent of the system mode, provides the separated second dimension.

The corresponding configurable function states or operation modes of the modules will be referred to as module modes in order to provide also a conceptual separation from the system modes.

According to one embodiment, the modules include a request input which determines the relevant module mode for the respective module. The request input replaces the former "enable bits" (e.g., a suspend enable bit, a power-down enable bit etc.) which altogether communicated a corresponding system mode request directly to every single module.

In the above embodiment, only the module mode to be applied is communicated via the request input of the module. However, the module does no longer receive any information about the cause for the application of the module mode, which may e.g., be a certain system mode. Thus, on the module level, a prioritization among system modes requests is no longer required.

According to the structure of another embodiment of the electronic controlling device, each one of the modules includes a configuration unit to define the translation of a system mode request distributed to the respective module to a configurable module mode request which is forwarded to the respective module. Hence, the configuration unit serves as a "translation specification" between the system mode which is requested on the system level and the corresponding module mode which is forwarded to the module.

In another embodiment, the configuration units may be programmable such that a user of the electronic controlling device may configure the mapping of each system mode onto a predetermined module mode according to the respective application of the electronic controlling device. This mapping of the module functions and the system modes provides the third separate dimension in the abstract hierarchy model of an electronic controlling device, namely the application dimension.

One embodiment of the configuration unit may include a programmable configuration field for each system mode. In this embodiment, the actually requested system mode may be configured to choose which configuration field is forwarded to the respective module in form of the corresponding module mode request.

The programmability of the configuration fields in the configuration units provides the possibility to choose a desired module mode for each system mode on a module specific basis and to change it even during operation of the electronic controlling device, as the application of the electronic controlling device may require. This allows to change the currently applied module mode via software without a change of the system mode.

Hence, the proposed microcontroller architecture provides a simple and universally programmable unit, which allows to efficiently decouple the first and the second dimensions of the above described abstract hierarchy model of an electronic controlling device. Moreover, the proposed microcontroller architecture provides a clear decoupling of hardware based and software based changes of the module behavior.

The third dimension of the above described abstract hierarchy model of an electronic controlling device, which refers to different application of modes within the different modules, may be implemented by allocating an independent configuration unit to preferably each single module.

Figure 1:
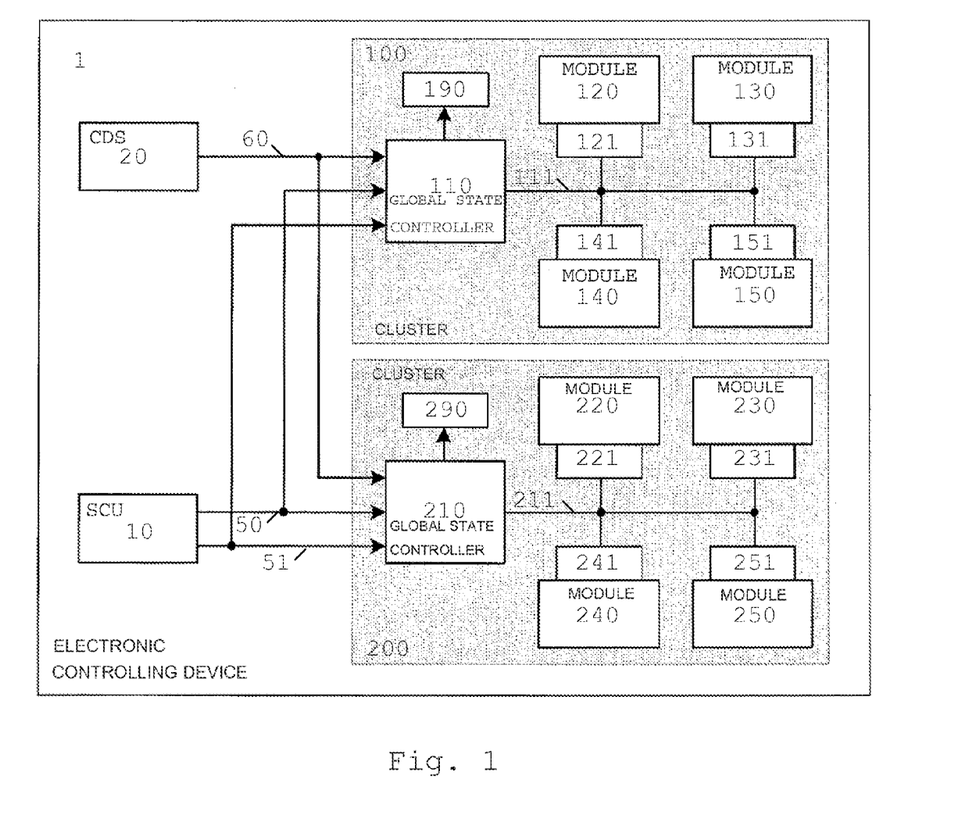
FIG. 1 illustrates a schematic block diagram of an embodiment of an architecture of an electronic controlling device.

FIG. 1 illustrates a schematic block diagram of one embodiment of an architecture of an electronic controlling device.

The embodiment of the electronic controlling device 1 includes two clusters 100, 200 which are configured according to corresponding clock, power and/or reset domains.

In the embodiment of FIG. 1, within each of the two clusters 100, 200, the electronic controlling device 1 includes a plurality of modules 120, 130, 140, 150 and 220, 230, 240, 250 respectively. Furthermore, each of the two clusters 100, 200 includes a global state controller 110, 210. Global state controllers 100, 200 may act as global units to centrally control the system mode of the electronic controlling device 1 depending on a corresponding system mode request. Each one of the plurality of modules 120, 130, 140, 150 and 220, 230, 240, 250 is configured to receive a global mode request signal 111, 211 from the global state controller 110, 210 within the respective cluster 100, 200 via the respective local state controllers 121, 131, 141, 151 and 221, 231, 241, 251. Local state controllers 121, 131, 141, 151 and 221, 231, 241, 251 may act as part of the interface between the global state controllers and the respective modules to complete the translation of system mode requests to individually configurable local mode request signals.

Further referring to the embodiment of FIG. 1, each one of the global state controllers 110, 210 is configured to receive a plurality of system mode requests from a system control unit (SCU) 10. In the embodiment, the system mode requests include a power down request signal 50 and a synchronous reset request signal 51.

Moreover, each one of the global state controllers 110, 210 is configured to receive a plurality of debug mode requests from a chip debug system (CDS) 20. In the embodiment, the debug mode request includes a suspend request signal 60.

In one embodiment, a control handshake mechanism effects the communication between module kernels and their environment. The module kernels of different microcontroller instances are preferably identical, whereas the usage of the modules in different microcontroller instances may be different. In this context, the kernel of a module may be understood as the functional part of a module without the connections to the rest of the infrastructure of the electronic controlling device.

This implies that specific functions or features of a particular electronic controlling device instance are preferably not handled or implemented on module level, but on a higher implementation hierarchy level, namely, in the embodiment of FIG. 1, on the level of the global state controllers 110, 210. Specific functions or features of a particular electronic controlling device instance can, for instance, refer to the clustering of a particular electronic controlling device instance in clock, power or reset domains or clusters. A typical example for such a function may be the step-by-step disabling of modules or clusters of modules for power savings reasons.

In one embodiment, inside a cluster, there may only be one synchronous clock domain visible for the user. Although other internal clocks may be implemented in the respective cluster, they may not be visible for the control handshake mechanism.

Furthermore, a cluster may include its own power domains or at least a single power domain. However, in other embodiments, several clusters may share the same power domain.

In the embodiment illustrated in FIG. 1, two clusters 100 and 200 are implemented. Each cluster 100, 200 includes its own power domain with an independent voltage regulator (EVR) 190 and 290 respectively. The power control inside a cluster 100, 200 may be performed by the corresponding global state controller 110, 210. The chip debug system 20 is configured to generate a suspend request signal 60 which is distributed to each cluster 100, 200.

The system control unit 10 is configured to generate a power down request signal 50, which may e.g., be based on an input pin indicating a loss of power in the near future. In order to minimize the overall power consumption, it can be desired to switch off one or even both of the clusters 100, 200 of the electronic controlling device 1 immediately under hardware control. Therefore, the global state controllers 110, 210 may be configured to switch off the respective independent voltage regulators 190, 290.

In one embodiment including a global state controller for each cluster, the global state controllers may each handle the following actions for the entire, respective one of the clusters:

Switching on/off the power supply in case the cluster includes its own independent voltage regulator Distributing the suspend mode to all modules in the respective cluster Distributing a global functional (synchronous) reset request to all modules in the respective cluster Locally prioritizing incoming hardware requests for the respective cluster (e.g., power a down request may overrule a suspend request)

In one or more embodiments, in order to keep the global state controller structure as simple as possible, one global state controller per cluster may be used.

In the embodiment of FIG. 1, the combination of clusters 100, 200 may be controlled by applying all external signals 50, 51, 60 in parallel to all global state controllers 110, 210 in the clusters 100, 200.

In this embodiment, there is no need for an explicit handshake between the global state controllers 110, 210 and the control units on a higher hierarchical level, namely, in the embodiment of FIG. 1, the chip debug system 20 and the system control unit 10. This is caused by the fact that the global state controllers 110, 210 only need to execute the requests distributed by the control units as, for instance, the system control unit 10 and the chip debug system 20. An acknowledgement is not mandatory but advantageous for further handling of the system modes, e.g., in a case of step-by-step powering down of clusters of modules. Preferably, a cluster is powered down if all modules in the cluster have reached a respective predefined state.

Still referring to the embodiment in FIG. 1, in addition to the control functionality of the global state controllers 110, 210, more specific functional adjustments may be enabled by the local state controllers or local state controllers parts 121, 131, 141 and 151 as well as 221, 231, 241 and 251 associated to the respective modules or module kernels 120, 130, 140 and 150 as well as 220, 230, 240 and 250. On module level, the following tasks may be handled or functions may be enabled:

Switching on/off the clock for a specific module (each module in a cluster can be enabled individually)

Defining the suspend behavior (immediate reaction, a so called granted suspend, when a specified state is reached, or no effect)

Requesting a local module reset (functional, synchronous)

In certain embodiments, all functions which may be triggered and/or determined under hardware control may also be triggered and/or determined under software control. For example, in one embodiment, for each function, a selection bit may determine whether the function is handled under hardware control such that the software control is ignored, or under software control such that the hardware control is ignored. The selection bit may preferably be located where the conflict between hardware and software might occur.

In one embodiment the actual status and the mode of a module can be evaluated by only once reading the corresponding status register. In embodiments which allow to change modes under software control, the support for diagnosis by software is preferable. Since a change of the requested mode of a module can occur at any time, the requested mode is preferably evaluated repeatedly or even constantly.

Figure 2:
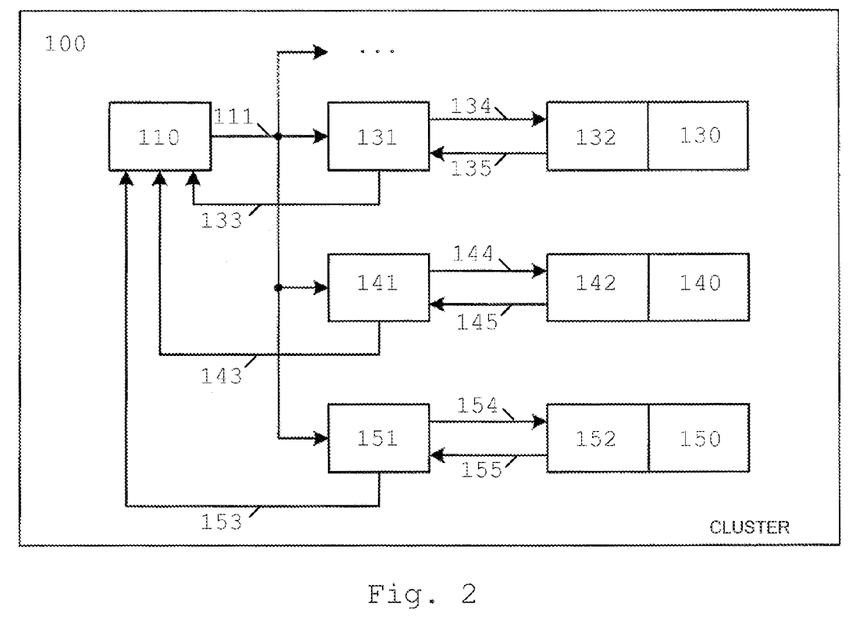
FIG. 2 illustrates a schematic block diagram of a control handshake structure according to one embodiment.

Referring now to an embodiment of a single cluster 100 in FIG. 2, it is illustrated that the global state controller 110 may generate a global mode request signal (GMR) 111 which may be distributed to all modules 130, 140 and 150 in the cluster 100. The global mode request signal 111 may by processed by each of the local state controllers 131, 141, 151 which, in the block diagram representation of FIG. 2, are located near to the module, e.g., in a bus peripheral interface (BPI). Depending on the type of global mode request signal 111, the local state controllers 131, 141, 151 each return a corresponding global mode acknowledge signal (GMA) 133, 143, 153 for the respective module 130, 140, 150.

In the embodiment according to FIG. 2, the communication between the local state controllers 131, 141, 151 and the modules 130, 140, 150 is handled via the kernel state controller part 132, 142, 152 of the modules 130, 140, 150. The local state controllers 131, 141, 151 each may generate a corresponding local mode request signal (LMR) 134, 144, 154 which depends on the global mode request signal 111 or software actions respectively. The kernel state controllers 132, 142, 152 answer these request by returning corresponding local mode acknowledgement signals (LMA) 135, 145, 155 to the local state controllers 131, 141, 151.

In certain embodiments the reaction of a local state controller to an incoming global mode request may be disabled. In this case, the global mode request is not taken into account and the local mode request is not changed. This functionality may be useful if the global state controller activates a suspend request but the module is not supposed to go into the suspend mode due to predetermined reasons.

In certain embodiments, the module may be disabled by e.g., switching off the clock within the module locally by the local state controller under software control, while the global state controller outputs a global mode request which would—without the disabling of the module—cause a different reaction of the module.

Figure 3:
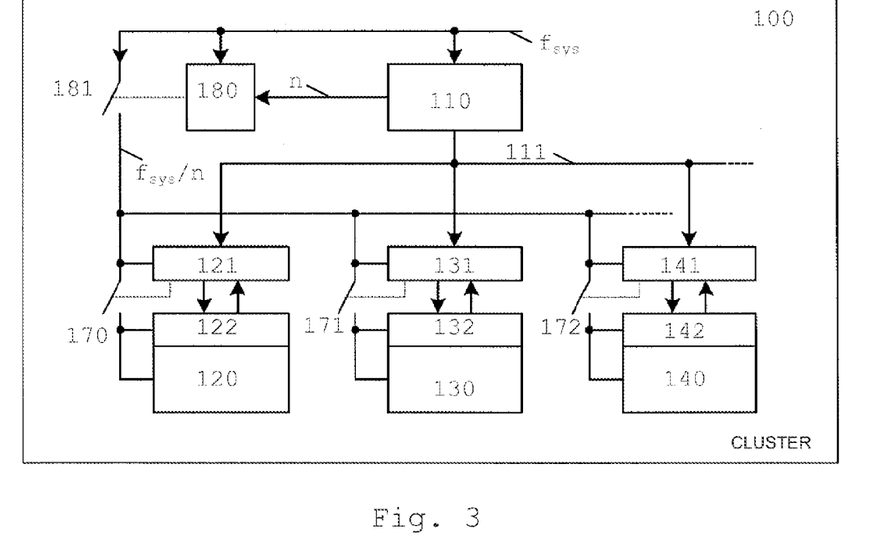
FIG. 3 illustrates a schematic block diagram of a clock distribution hierarchy according to one embodiment.

Referring now to FIG. 3, it is illustrated that the clock frequency of a cluster 100 is derived from the input frequency $f_{sys}$ of the cluster 100. In order to support a full speed mode and a reduced speed mode, the global state controller 110 may define a divider ratio of n by the frequency divider 180. The factor n may be programmable in the global state controller 110 and may preferable be under software control in order to guaranty a reproducible behavior.

The above mentioned speed modes may be characterized as follows:

full speed mode: n=1, all clock edges are passed to the modules reduced speed mode: n>1, every n-th clock edge is passed to the modules In one embodiment, the range of n may e.g., be from 1 to 16. In the reduced speed mode, handshake signals between modules of different clusters may preferably take into account that not all clock edges are available.

The reduced speed mode may be useful to reduce the power consumption of the corresponding clusters, while a certain performance decrease within the clusters may be accepted. With a module being in the reduced speed mode, the number of accesses to registers of this module may be preferably minimized.

In further embodiments, the clock of each module may be switched on or off independently from the speed modes and individually, e.g., under software control by a local clock gate 170, 171, 172 controlled by the corresponding local state controller 121, 131, 141, or globally, e.g., inside the cluster 100, under software or hardware control by a global clock gate 181, controlled by the global state controller 110.

Figure 4:
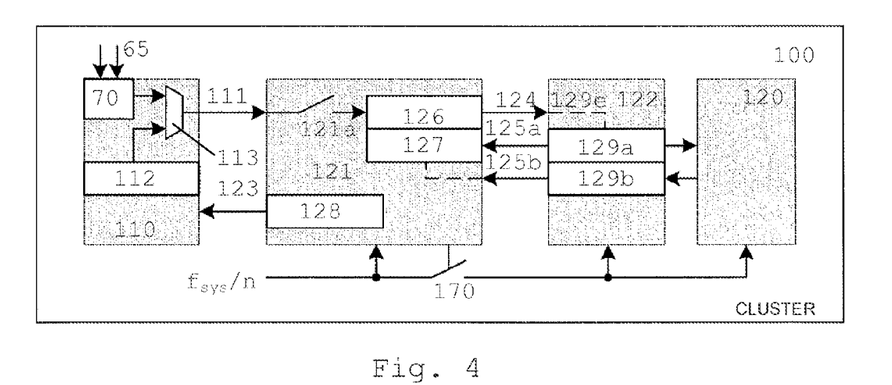
FIG. 4 illustrates a schematic block diagram of a handshake signal flow between a global state controller (GCS), a local state controller (LSC) and a kernel state controller (KSC) according to one embodiment.

Referring now to FIG. 4, it is illustrated that the global state controller 110 includes a register GSC_CUR 112, defining the global operating mode which may be defined by software, e.g., for a normal operation mode, a clock off mode or power down mode for the complete cluster 100. In an embodiment, the register GSC_CUR 112 may not be changed by hardware.

Depending on the priority of the externally requested modes represented by the external mode request signals 65 stored in a corresponding external mode register 70 of the global state controller 110, such as a suspend mode, a power down mode or an emergency mode, the global state controller 110 may output either the current externally requested mode or the mode defined by the register GSC_CUR 112 in form of the global mode request signal 111.

The priority scheme for prioritization among the externally requested modes may be preferably handled locally inside the global state controller 110 and, hence, does not effect the handshake mechanism with the local state controller 121. The priority scheme may be implemented in form of a prioritizing multiplexer 113.

Accordingly, the global mode request 111 of the global state controller 110 may change at any point in time, depending on the external mode request signals 65 or write actions by software to the register GSC_CUR 112.

In the local state controller 121, software can define whether the global mode request signal 111 is taken into account as a corresponding configurable local mode request which may be stored in a register LSC_REQ 126. If so, the register LSC_REQ 126 may be permanently updated by global mode request signal 111. The register LSC_REQ 126 outputs the local mode request signal 124.

If not, the global mode request signal 111 is not taken into account and the register LSC_REQ 126 is only changed by software. In an embodiment, the local state controller 121 may include a register for defining the local operating mode by software.

In the embodiment according to FIG. 4, it may be defined locally—e.g., by the programmable switch 121a in the local state controller 121—whether the global mode request 111 is taken into account and this definition may depend on the globally requested mode. In another embodiment, all the global mode request signals of all global state controllers may be disabled for consideration by all local state controllers.

In further embodiments, only the suspend request signal may be disabled locally if the corresponding module should not enter the suspend mode.

Further referring to the embodiment in FIG. 4, the local state controller 121 may also define the characteristics of the suspend mode, i.e. if e.g., an immediate or granted suspend should by applied, and may control the functional enable for the module 120 accordingly.

According to one embodiment, in the suspend mode, the module clock is not stopped, such that the registers of the module can still be written or read out.

In the embodiment according to FIG. 4, in case the local mode request signal 124 corresponds to the clock off mode, the local state controller 121 may wait for the kernel state controller 122 before switching off the module clock by the local clock gate 170.

In one embodiment, after a cluster is controlled to leave the power down mode, e.g., by switching on again the independent voltage regulator of this cluster, the global state controller associated with that cluster may—preferably always—cause a reset by activating an asynchronous reset of the entire cluster. This reset may enable the local state controllers of the cluster to take subsequent global state controller requests into account again.

Further referring to the embodiment in FIG. 4, the register LSC_STAT 128 of the local state controller 121 and the corresponding local mode acknowledgement signal 123 are configured to indicate to the global state controller 110 when the mode requested by the global mode request signal 111 has been reached by the module 120.

In a local operation mode in which the local state controller 121 is configured to ignore the global mode request signals 111, the register LSC_STAT 128 may be configured to return an OK signal instead of the local mode acknowledgement signal 123 to the global state controller 110. In this way—as long as the register LSC_STAT 128 returns the OK signal—the global state controller 110 may ignore the local state controller 121 with respect to all mode changes which would otherwise require specific local mode acknowledgement signals 123 as part of a handshake signal from the local state controller 121.

In the embodiment according to FIG. 4, a local mode handshake between local state controller 121 and the kernel state controller 122 includes the local mode request signal 124 from the local state controller 121 to the kernel state controller 122 and at least local mode acknowledge signal 125 from the kernel state controller 122 back to the local state controller 121.

With respect to the embodiment in FIG. 4, the handshake between the local state controller 121 and the kernel state controller 122 includes:

the local mode request signal 124 indicated by the register LSC_REQ 126;

a first part of the local mode acknowledgement signal 125a based on the content of a register KSC_CUR 129a of the kernel state controller 122 wherein the register KSC_CUR 129a indicates the current mode of the module kernel 120;

a second part of the local mode acknowledgement signal 125b based on the content of a register KSC_STAT 129b of the kernel state controller 122 wherein the register KSC_STAT 129b indicates the status of the module kernel 120 and wherein the second part of the local mode acknowledgement signal 125b is used to validate the content of the register KSC_CUR 129a.

Figure 5:
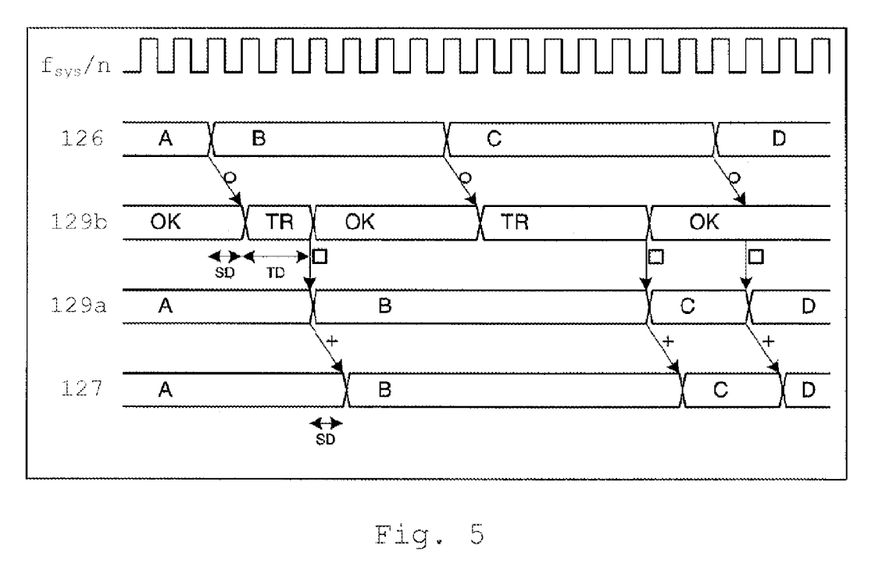
FIG. 5 illustrates a timing diagram of a standard handshake between the local state controller and the kernel state controller according to one embodiment.

A timing diagram of a typical handshake between the local state controller 121 and the kernel state controller 122 is illustrated in FIG. 5. The first signal chart of the timing diagram below the module clock $f_{sys}/n$ corresponds to the content of the register LSC_REQ 126 which represent the requested mode. In case that the current mode of the module kernel 120—indicated by the content of the register KSC_CUR 129*a* and corresponding to the third signal chart below the module clock $f_{sys}/n$ in FIG. 5—is not equal to the requested mode in register LSC_REQ 126, a transition to the requested mode is started represented in FIG. 5 with the content of register KSC_STAT 129*b* being marked with TR which stands for transition. In order to indicate that the current mode has reached the requested one, the content of register KSC_STAT 129*b* is marked with OK.

Therefore, the contents of registers LSC_REQ 126 and KSC_CUR 129*a* are compared. If a not-equal condition is detected, which is marked by the small circles in FIG. 5, the content of register KSC_STAT 129*b* illustrated in the second signal chart below the module clock $f_{sys}/n$ changes from OK, which indicates that the current mode is equal to the requested one, to TR, which indicates that the module kernel 120 is in transition to the requested mode. The time spans SD and TD in FIG. 5 respectively represent the synchronization delay and the transition delay of the register KSC_CUR 129*a* with respect to the point of time in which the requested mode in register LSC_REQ 126 changes.

If the module kernel 120 can reach the requested mode directly in the next clock cycle, the transition state may be skipped. When the requested state is reached, this is indicated by the register KSC_STAT 129*b* being set to OK and the register KSC_CUR 129*a* being set to the requested mode. The corresponding points in time are marked by small rectangles in FIG. 5. The state TR (in transition) may be—preferably always—left synchronously with the register KSC_CUR 129*a* indicating the new mode.

When the local state controller 121 detects that the kernel state controller 122 signals an OK, the local state controller 121 sets the content of the register LSC_CUR 127 to the content of register KSC_CUR 129*a*, which is marked by the plus signs in FIG. 5. By software read accesses the corresponding registers LSC_REQ 126, LSC_CUR 127, KSC_CUR 129*a* and KSC_STAT 129*b*, the current mode, the requested mode and the transition or an error phase can be exactly evaluated.

Figure 6:
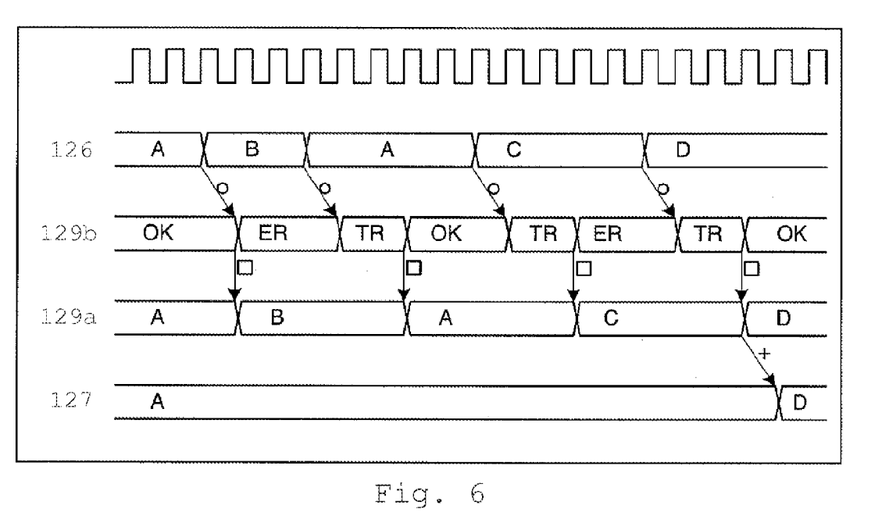
FIG. 6 illustrates a timing diagram of a handshake between the local state controller and the kernel state controller with an error condition according to one embodiment.

The error phase is illustrated in the timing diagram of a handshake between local state controller 121 and kernel state controller 122 in FIG. 6. Under certain conditions—e.g., because of an internal module failure, a timeout or a request of a not implemented mode, for example mode B—the module kernel 120 may not be able to reach the requested mode. In case such an error condition is detected, the first 125*a* and second part 125*b* of the local mode acknowledgement signal indicate an error. In the error case, the register KSC_STAT 129*b* is set to ER and the register KSC_CUR 129*a* is set to the requested mode to indicate which mode has lead to the error condition, while all functional internal activities of the specific module kernel 120 may be stopped.

In case of an error condition, the local state controller 121 may automatically request the last successfully reached mode. This mode may be stored in the register LSC_CUR 127 which may be updated by the content of register KSC_CUR 129*a* if the register KSC_STAT 129*b* indicates OK. In an embodiment, the automatic reactivation of the last successfully reached mode may be enabled or disabled under software control in the local state controller 121.

The fact that a specific action is required from a certain module and the fact that a requested mode is taken into account by a module (and more precisely by the local state controller of the module) are preferably considered as two independent phenomena. With respect to the first phenomenon, in typical embodiments some of the global mode requests are configured to be initiated by hardware, such as a suspend mode request, a power down mode request or an emergency mode request. With respect to the second phenomenon, also in typical embodiments, however, actions may be controlled locally and individually for each module by software. Therefore, in order to avoid possible priority conflicts between global mode requests and software controls, a kind of arbitration scheme may be introduced in embodiments of the invention.

In one embodiment, the arbitration scheme may work on two levels. The first level may be located inside the global state controller 110. There, two mechanisms may collide: The actions that are handled under software control—e.g., with respect to the embodiment in FIG. 4, using the register GSC_CUR 112 which defines the global operating mode by software—and the actions triggered by hardware, e.g., by the external mode request signals 65 stored in the external mode register 70.

For example, software may define the desired functionality of the entire cluster, such as:
Reset (default after power up, by enabling an independent voltage regulator)
Power down (by disabling an independent voltage regulator)
Clock off or reduced clock
Normal operation wherein the signification of normal operation, i.e. the normal module behavior, may be defined individually for each module in the corresponding local state controller In certain embodiments, the hardware may also request specific modes depending on the implementation. Since the global state controllers may be designed for each electronic controlling device individually, the global state controllers may be designed differently with respect to priority among or in the number of requests under hardware control. This may not be desirable from a design point of view in every case, but is feasible if needed for flexibility purposes.

In certain embodiments, functions under hardware control are mainly emergency or real-time critical functions, such as:
Suspend mode (may be requested by the chip debug system)
Power down (may be requested by the system control unit, e.g., depending on an external emergency input signal)

In addition to the above functionalities, further hardware controlled modes may be implemented in corresponding embodiments. The arbitration scheme of a global state controller can be adapted easily to introduce other functions due to its modular structure. Furthermore, it is also possible to request a suspend mode under software control.

Referring back to the embodiment in FIG. 4, the functionalities requested under software control may be written to the register GSC_CUR 112 of the global mode controller 110. The content of the register GSC_CUR 112 represents the current mode requested by the global state controller 110 without any intervention of requests under hardware control. The register GSC_CUR 112 is typically not changed by hardware, except after a power up, when the global state controller 110 may also request a reset of the entire cluster. In the embodiment according to FIG. 4, each hardware request signal, here the external mode request signals 65, may be individually enabled or disabled in the global state controller 110.

Correspondingly, in a embodiment a first priority scheme may be that, in case there is a hardware request, it will have priority over a concurrent software request. Taking the example of the two hardware requests known today, namely the suspend and the emergency power down request, in one embodiment the following priority scheme of the global state controller 110 is proposed:

Emergency power down (high priority)
Suspend mode and software controlled modes (low priority)

In most of today's applications for microcontrollers, this priority scheme will meet the requirement for system safety and debugging.

In further embodiments, a second arbitration level may be located in the local state controllers. In fact, the arbitration on the local state controller level can also be understood as a configuration. With respect to the embodiment in FIG. 7, the local state controller 121 may include configuration bit fields 127a, 127b, 127c, 127d, 127e which may be configured under software control for each of the different global mode request signals 111. In certain embodiments not all global modes requests require a programmable configuration. For example, the reset mode request may be hard coded. In a still further embodiment, an emergency mode request may be hard coded as well.

For example, when the global state controller requests normal operation of a module, it is preferable to have the possibility to enable or disable each module of a cluster individually. As a result, the meaning of "normal operation" may be different for each module, e.g., it may be a run mode, a clock off mode, etc. Furthermore, in case a suspend mode is requested, it is preferable to differentiate between an immediate suspend, a granted suspend or no suspend at all. In a corresponding embodiment, this suspend mode behavior is also configurable individually for each module.

Hence, in certain embodiments, in order to avoid complex priority schemes, the arbitration may be performed in two steps. With respect to the embodiment according to FIG. 7, in the first process, the global state controller 110 sends global mode requests 111, i.e. issues "only" "orders" to the local state controller 121.

Figure 7:
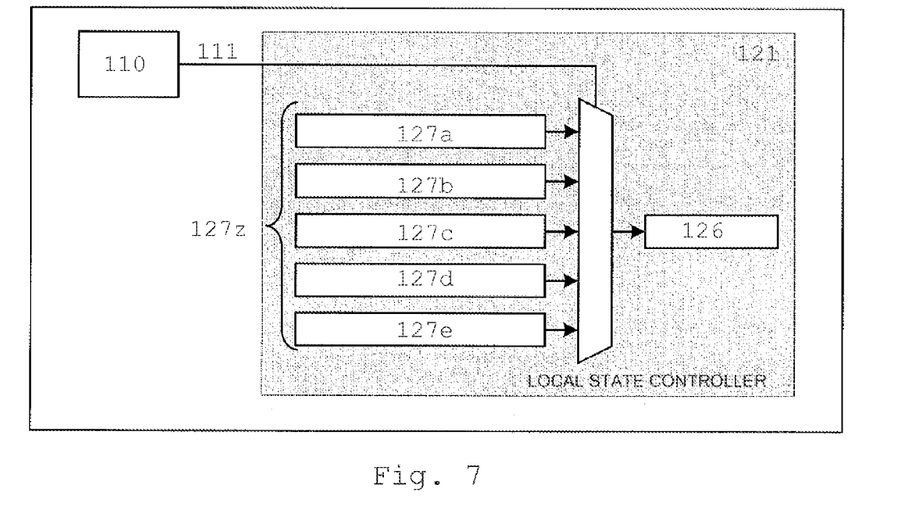
FIG. 7 illustrates a schematic block diagram of a local state controller configuration according to one embodiment.

These global mode requests 111 may not be directly related to the behavior of the corresponding module. Inside the local state controller 121, the responsiveness and the behavior of the corresponding module as reactions or answers to these global mode requests 111 can be configured individually. As a result, in certain embodiments, it may suffice to implement only one "real" arbitration mechanism between the software control and hardware events in the global state controller 110 with very simple rules.

In this way, a priority conflict will not occur in the local state controller 121 due to the configuration capability under software control.

The global state controller 110 sends global mode requests 111 and their mapping to the module modes may be defined by configuration in the local state controller 121. By the separation of global mode requests 111 and—preferably programmable—module modes 127z, priority conflicts may be avoided.

The local state controller 121 may request the module kernel to operate in a desired mode or to change to another mode. In this process, the reason why a specific mode has been requested is not communicated to the module kernel, since this information is not needed in the module kernel and would not change the behavior of the module kernel in any manner. In the embodiment according to FIG. 4, the module 120 (more precisely the kernel state controller 122) therefore includes a single mode request input 129e driven by the local mode request signal 124 of the local state controller 121.

Depending on the internal structure and the task of the kernel, the effect of the module modes can differ from one module to another. In certain embodiments, the module modes may comprise:

a run mode (operation of the module as specified)
a synchronous reset (all flip-flops of the module are set to their specified reset values)
reaching a specified state and stop there (granted request)
stopping immediately and going to a defined state (like a trap-behavior for fail-safe, not necessarily the reset state)

In certain embodiments, in order to provide flexibility for future extensions, the following module modes are proposed, wherein in some cases, the module mode can preferably be defined individually for each module:

For example, the module modes may include different run modes respectively causing a different operation behavior of the respective module. Furthermore, different stop modes may be implemented with different end conditions. Optionally, the module modes may include forcing a reset or other auxiliary modes for future extensions.

An example of a set of module modes may be the following:

Run mode 0 (no grant signal is generated)
Run mode 1 (a grant signal is always generated)
Synchronous reset (default after power up)
Stop mode 0 (reach specified state 0, stop and generate a grant signal)
Stop mode 1 (stop immediately, go to defined state 1 and generate a grant signal)
Stop mode 2 (reach specified state 2 in which the clock can be switched off, stop and generate a grant signal)
Auxiliary mode 0 and 1 (for future extensions). If an auxiliary mode is not implemented in a module, its behavior is preferably specified and will preferably not lead to any module action (preferred behavior: like synchronous reset).

The behavior and the possible transitions between each of these module modes are preferably to be defined individually for each module, since in a microcontroller application, e.g., a Control Area Network (CAN) has different requirements compared to a timer or a flash array. For these requirements, a versatile control handshake mechanism may not be suited and therefore the requirements are preferably to be handled in each kernel.

In certain embodiments, in case a module is to be disabled inside a running cluster, the local state controller configuration for normal operation is preferably to be written with stop mode 2 instead of run mode 0 or 1 for the operating modules.

In further embodiments, in case a module should not react to suspend requests, the local state controller configuration for a suspend mode may be the same as for normal operation (e.g., run mode 0). For an immediate suspend, a stop mode is preferably chosen (e.g., stop mode 1). A granted suspend behavior may be reached by programming another stop mode (e.g., stop mode 0) or other stop modes.

In the following, an analog-to-digital conversion (ADC) module is described as one possible application of the invention and as a further embodiment. In this embodiment, the mode control mechanisms for power saving, suspend and other system control tasks may be implemented in the ADC module kernel.

In the ADC module, predetermined operations may be interrupted under certain conditions. The conditions may be defined by the global state controller, which combines all related functions that may lead to an immediate module reaction, like a suspend mode request or a power-down indication. For example, if a power failure is detected to happen in a certain time by a pre-warning mechanism some modules may stop operation for power saving reasons, whereas others may continue working.

To the ADC module itself no information is communicated why its module mode—i.e. it operation mode—changes. Correspondingly, if a new module mode is requested, the ADC module simply enters this module mode.

For the ADC module, the following internal operations may be influenced or configured by the mode control mechanism:

A Current Conversion of an Analog Value:

If a digital part of the ADC module has detected a pending request for analog-to-digital conversion, a corresponding analog part of the ADC module may be started. This start may be enabled by the mode control mechanism. If the current module mode allows the conversion start, e.g., in run modes 0 and 1, the conversion will be executed. If the module mode does not allow the conversion start, e.g., in stop modes 0 and 1, the conversion is not started. The request for the conversion start is not cancelled, but "frozen". A "frozen" conversion may be started as soon as the module mode is changed to a run mode again.

An Arbiter Round:

The start of a new arbiter round may be enabled by a certain module mode. For example, in stop mode 1, a new arbiter round will not start.

Figure 8:
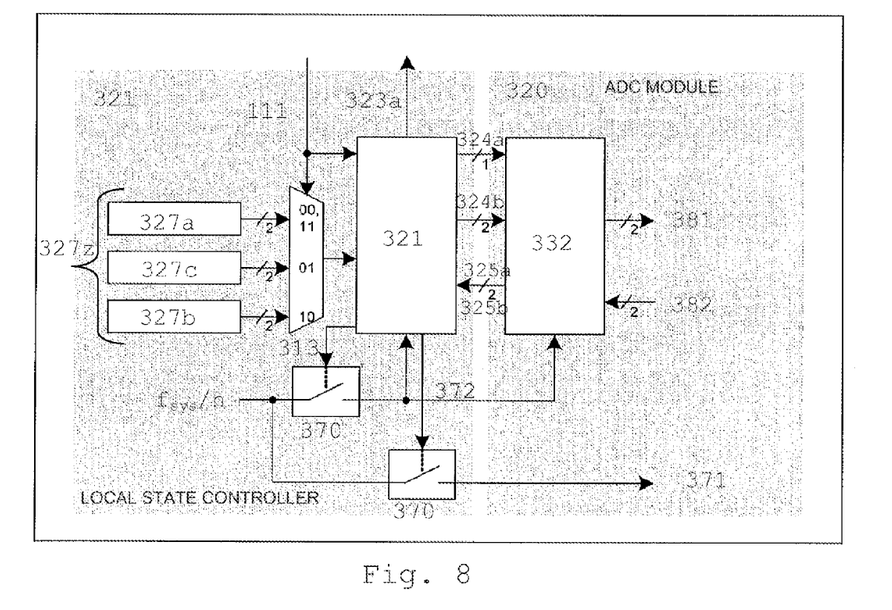
FIG. 8 illustrates a block diagram of an interface according to one embodiment.

324b represent the requested module mode. If the kernel is currently in a transition, i.e. if the latest requested module mode has not yet been reached, the signal KCR 324b is also sampled.

The two output signals KSC_ERR 325a and KSC_ACK 325b of the kernel state controller 332 may be read from corresponding registers in the kernel state controller 332 and send to the local state controller 321. The switching behavior of the signal KSC_ERR 325a may be as follows:

Set to O if the signal KCRV 324a equals O.
Set to 1 if the requested module mode can not be reached.
The switching behavior of KSC_ACK may be as follows:
Set to 0 if the signal KCRV 324a equals 0.
Set to 1 if the requested module mode has been reached after the signal KCRV 324a equals 1.

If the module mode has been reached while the signal KCRV 324a equals 1, the kernel state controller 332 compares the currently reached mode with the signal KCR 324b. If they are identical, the signal KSC_ACK 325b will be set to 1. If they are not identical, KSC_ACK 325b is not set and a new value of the signal KCR 324b is taken into account for a new transition. The ADC kernel tries to reach the sampled requested mode indicated by sampled signals KCR 324b.

With respect to the ADC module embodiment, the following module modes may be defined:

TABLE 1

ADC Module modes

| Functional Mode | Kernel Behavior | Grant activation | Kernel Code[1] |
|---|---|---|---|
| run mode 0 | operation as specified, no explicit stop condition | immediate | $00_B$ |
| run mode 1 | operation as specified, no explicit stop condition | immediate | $01_B$ |
| stop mode 0 | A currently running AD conversion is completely finished and the result is processed by the digital part. Pending conversion requests to start a new conversion are ignored (but not deleted). The arbiter and the analog part continue working (i.e. the corresponding clocks $f_{ADCD}$ and $f_{ADCl}$ are not stopped). | After the result is written to the result register and the related interrupt pulse has been generated. | $10_B$ |
| stop mode 1 | Like stop mode 0, but the arbiter is stopped after it has finished its arbitration round (i.e. the corresponding clocks $f_{ADCD}$ and $f_{ADCl}$ are stopped[2]). | After the result is written to the result register, the arbiter has stopped and the related interrupt pulse has been generated. | $11_B$ |

[1]This mode is represented by the value of flip-flops sampling the KCR 324b signal inputs with the rising edge of the signal KCRV 324a.
[2]If the clock $f_{ADCl}$ is stopped during a running conversion, the conversion result after restarting the clock again is not valid.

FIG. 8 illustrates a block diagram of a basic structure of an interface between the local state controller 321 and the kernel state controller 332 of the ADC module. The global mode request signals CR, CRV 111 are distributed from the global state controller to the prioritizing multiplexer 313. The module modes 327z corresponding to the different global mode requests 111 may be configured by software e.g., by corresponding bit fields 327a, 327b, 327c of a kernel state configuration register KSCFG.

In the kernel state controller 332 of the ADC module kernel 320, the input signals of kernel state controller 332 KCRV 324a and KCR 324b may be received from the local state controller 321 and stored in corresponding registers of the kernel state controller 332. The signals KCR 324b are sampled and taken into account with the rising edge of the signal KCRV 324a. The sampled value of the signals KCR The following module modes may be hard coded or may be configured in the kernel state configuration register KSCFG:

Normal Operation Mode:

The standard operation as specified is executed, functional enable signals 381 for the analog part and/or for the arbiter are constantly generated. If enabled by module enable bit field MODEN of the register KSCFG, the module clock 372 is running.

Suspend Mode:

The kernel parts may be stopped and no enable signals 381 are generated by the kernel state controller 332 when a specified condition is reached. Acknowledge signals 382 are generated when the kernel has reached a specified stop condition. The module clock 372 is not switched off. If enabled by the MODEN bit field of the register KSCFG, the module clock 372 is running.

Clock-Off Mode:

The kernel parts may be stopped and no enable signals 381 are generated when a specified condition is reached. Acknowledge signals 382 are generated when the kernel has reached a specified stop condition. The module clock 372 is switched off automatically—e.g., by the local clock gates 370—when all kernel parts have generated their acknowledge signal in the stop mode, ignoring the setting of the MODEN bit field of the register KSCFG.

Other global mode requests 111 from the global state controller may be ignored and treated like the above described normal operation mode.

The mode control mechanism for system control tasks, such as power saving, or a suspend request for debugging, allows to program the ADC module behavior under different device operating conditions. The behavior of the ADC kernels can be programmed for each of the device operating modes that are requested by the global state controller, which may be implemented as a part of the system control unit.

In one or more embodiments, the ADC kernels of an ADC module illustrate an identical behavior regarding the device operating modes, e.g., to avoid that a non-suspended kernel waits for a suspended kernel to start a synchronized conversion. Therefore, the ADC module may include a commonly associated register ADC0_KSCFG defining the behavior of all kernels of the ADC module in the following device operating modes:

Normal Operation:

This operating mode is the default operating mode when neither a suspend request nor a clock-off request are pending. The module clock 372 is not switched off and the ADC registers can be read or written. The kernel behavior is defined by bit field KSCFG.NOMCFG 327a of the register KSCFG.

Suspend Mode:

This operating mode is requested when a suspend request—which may e.g., be issued by a debugger—is pending in the device. The module clock 372 is not switched off and the ADC registers can be read or written. The kernel behavior is defined by the bit field KSCFG.SUMCFG 327c of the register KSCFG.

Clock-Off Mode:

This operating mode is requested for power saving purposes. The module clock 372 is switched off automatically when all kernels of the ADC module reached their specified states in a stop mode. In this case, ADC registers can not be accessed. The kernel behavior is defined by the bit field KSCFG.COMCFG 327b of the register KSCFG.

The behavior of the ADC kernels can be programmed for each of the device operating modes, e.g., the normal operation mode, the suspend mode and the clock-off mode. Therefore, the ADC kernels may support four module modes, as illustrated in the following Table 2.

TABLE 2

ADC Kernel Behavior

| Module mode | Kernel Behavior | Code |
|---|---|---|
| run mode 0 | kernel operation as specified, no impact on data transfer (same behavior for run mode 0 and run mode 1) | $00_B$ |
| run mode 1 | | $10_B$ |

TABLE 2-continued

ADC Kernel Behavior

| Module mode | Kernel Behavior | Code |
|---|---|---|
| stop mode 0 | A currently running AD conversion is completely finished and the result is processed. Pending conversion requests to start a new conversion are not taken into account but are not deleted They start conversions after entering a run mode as programmed. The arbiter continues as programmed. | $10_B$ |
| stop mode 1 | Like stop mode 0, but the arbiter is stopped after it has finished its arbitration round | $11_B$ |

In the described embodiment, the bit field KSCFG.NOMCFG 327a of the register KSCFG is preferably configured for run mode 0 as default setting for standard operation. If the ADC kernels are configured to not react to a suspend request and are to continue operation as in normal mode, the bit field KSCFG.SUMCFG 327c is to be configured with the same value as the bit field KSCFG.NOMCFG 327b. If the ADC kernels should illustrate a different behavior and stop operation when a specific stop condition is reached, the code for stop mode 0 or stop mode 1 is to be written to the bit field KSCFG.SUMCFG 327c.

A similar mechanism applies for the clock-off mode with the possibility to program the desired behavior by the bit field KSCFG.COMCFG 327b. The stop mode selection strongly depends on the application needs and it is very unlikely that different stop modes are required in parallel in the same application. As a result, only one stop mode type (either 0 or 1) should be used in the bit fields of the register KSCFG. Stop mode 0 and stop mode 1 are not to be mixed up and transitions from stop mode 0 to stop mode 1 (or vice versa) are preferably avoided for the ADC module.

If the module clock 372 is disabled by the bit field KSCFG.MODEN of the register KSCFG being set to 0, or in clock-off mode when the stop condition is reached (in stop mode 0 or 1), the ADC module cannot be accessed by read or write operations, except for the register KSCFG which can always be accessed. As a consequence, the ADC module can not be configured then. The bit field KSCFG.MODEN is to be set preferably by software while all bit fields of the register KSCFG are configured for run mode 0.

Figure 9:
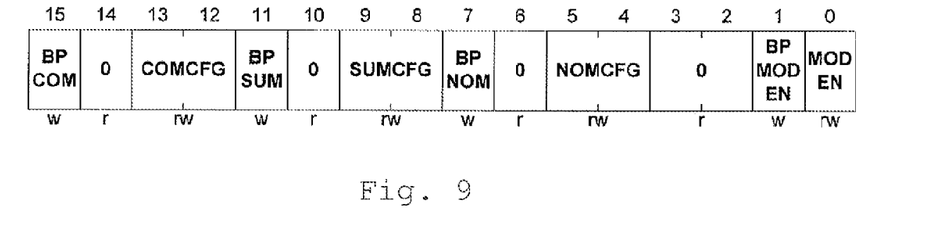
FIG. 9 illustrates a schematic diagram of a register according to one embodiment.

FIG. 9 illustrates a schematic diagram of the bit field mapping of the kernel state configuration register KSCFG according to an embodiment. The register KSCFG allows the selection of the desired module modes for the different device operating modes. Bit fields KSCFG.NOMCFG 327a and KSCFG.COMCFG 327b may be reset by a class 3 reset. Bit field KSCFG.SUMCFG 327c may be reset by a class 1 reset. The register KSCFG is a common register for all ADC kernels and may be accessed in the address range of ADC0. The coding of the bit fields KSCFG.NOMCFG 327a, KSCFG.SUMCFG 327c and KSCFG.COMCFG 327b is described in the following Table 3.

TABLE 3

Bit field map of the kernel state configuration register

| Field | Bits | Type | Description |
|---|---|---|---|
| MODEN | 0 | rw | Module Enable<br>This bit enables the module kernel clock and the module functionality.<br>  $0_B$  The module is switched off immediately (without considering a stop condition). The module does not react to mode control actions and the module clock is switched off. The module does not react to read accesses and ignores write accesses (except for accesses to register KSCFG).<br>  $1_B$  The module is switched on and may operate. After writing 1 to MODEN, it is recommended to read register KSCFG to avoid pipeline effects in the control block before accessing other ADC registers. |
| BPMODEN | 1 | w | Bit Protection for MODEN[3]<br>This bit enables the write access to the bit MODEN. It always reads 0.<br>  $0_B$  MODEN is not changed.<br>  $1_B$  MODEN is updated with the written value. |
| NOMCFG | [5:4] | rw | Normal Operation Mode Configuration<br>This bit field defines the module mode applied in normal operation mode.<br>  $00_B$  Run mode 0 is selected.<br>  $01_B$  Run mode 1 is selected.<br>  $10_B$  Stop mode 0 is selected.<br>  $11_B$  Stop mode 1 is selected. |
| BPNOM | 7 | w | Bit Protection for NOMCFG<br>This bit enables the write access to the bit field NOMCFG. It always reads 0.<br>  $0_B$  NOMCFG is not changed.<br>  $1_B$  NOMCFG is updated with the written value. |
| SUMCFG | [9:8] | rw | Suspend Mode Configuration<br>This bit field defines the module mode applied in suspend mode.<br>Coding like NOMCFG. |
| BPSUM | 11 | w | Bit Protection for SUMCFG<br>This bit enables the write access to the bit field SUMCFG. It always reads 0.<br>  $0_B$  SUMCFG is not changed.<br>  $1_B$  SUMCFG is updated with the written value. |
| COMCFG | [13:12] | rw | Clock Off Mode Configuration<br>This bit field defines the module mode applied in clock-off mode.<br>Coding like NOMCFG. |
| BPCOM | 15 | w | Bit Protection for COMCFG<br>This bit enables the write access to the bit field COMCFG. It always reads 0.<br>  $0_B$  COMCFG is not changed.<br>  $1_B$  COMCFG is updated with the written value. |
| 0 | [3:2], 6, 10, 14 | r | Reserved<br>returns 0 if read; should be written with 0. |

[3]The bit protection bits BPxxx allow partly modification of the configuration bit a single write operation without the need of a read-modify-write mechanism handled by the CPU.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An electronic controlling device comprising:
   a plurality of clusters each comprising a plurality of modules each performing specific functions within one of a plurality of module modes on reception of a corresponding module mode request signal;
   a device to distribute one of a plurality of system mode request signals; and
   a plurality of central system control units each associated with one of the plurality of clusters, each comprising a programmable register, and each configured to select, in reaction to the distributed system mode request signal, a respective one of a plurality of system modes and operate the plurality of modules of the respective cluster in the selected one of the plurality of system modes
   by distributing, in a first state of the respective programmable register, a signal different from the distributed system mode request signal, and defined by the first state of the register as the corresponding module mode request signal to the plurality of modules of the respective cluster, and
   by forwarding, in a second state of the respective programmable register, a signal corresponding to the distributed system mode request signal, and not defined by the second state of the register as module emergency mode request signal to the plurality of modules of the respective cluster, and
   by performing specific functions within a one module mode of the plurality of module modes on reception of the corresponding module mode request to the plurality of modules of the respective cluster, wherein the plurality of system mode request signals comprise power down requests and reset requests and
wherein a plurality of debug module request signals comprising suspend requests, and
by prioritizing concurrent ones of the plurality of system mode requests and/or the plurality of debug module request signals for the plurality of modules or for the plurality of modules independently.

2. The electronic controlling device of claim 1, wherein the plurality of modules comprises at least one configuration unit to define a translation of the system mode request signal distributed to the plurality of modules into the corresponding module mode request signal forwarded to the respective module.

3. The electronic controlling device of claim 2, comprising wherein the at least one configuration unit is programmable to configure a mapping of at least one of the plurality of system modes onto a predetermined one of the plurality of module modes.

4. The electronic controlling device of claim 2, wherein the at least one configuration unit comprises a programmable configuration field for mapping of at least one of the plurality of system modes onto a predetermined one of the plurality of module modes.

5. The electronic controlling device of claim 4, comprising wherein the system mode request signal distributed to the plurality of modules is configured to select which programmable configuration field is forwarded to the plurality of modules in form of the corresponding module mode request signal to translate the distributed system mode request signal to the module mode request signal.

6. The electronic controlling device of claim 1, wherein the plurality of modules comprises an input configured to receive the module mode request signal.

7. An electronic controlling device comprising:
a plurality of clusters each comprising a plurality of modules to perform at least one predetermined function on reception of at least one corresponding module mode request signal;
a device to distribute one of a plurality of system mode request signals; and
a plurality of global state controllers (GSC) each associated with one of the plurality of clusters, each comprising a programmable register, and each configured to select, in reaction to the distributed system mode request signal, a respective one of a plurality of system modes by distributing, in a first state of the respective programmable register, a signal different from the distributed system mode request signal, and defined by the first state of the register as the corresponding module mode request signal to the plurality of modules of the respective cluster, and by forwarding, in a second state of the respective programmable register, a signal corresponding to the distributed system mode request signal, and not defined by the second state of the register as module emergency mode request signal to the plurality of modules of the respective cluster, and
by performing specific functions within a module mode on reception of the corresponding module mode request to the plurality of modules of the respective cluster,
wherein the plurality of system mode request signals comprise power down requests and reset requests and
wherein a plurality of debug module request signals comprising suspend requests, and
by prioritizing concurrent ones of the plurality of system mode requests and/or the plurality of debug module request signals by the plurality of global state controllers for the plurality of modules or for the plurality of modules independently.

8. The electronic controlling device of claim 7, wherein, within each of the plurality of clusters, the plurality of modules are configured to receive the module mode request signal from the associated global state controller.

9. The electronic controlling device of claim 7, wherein the plurality of global state controllers are configured to receive the plurality of system mode request signals from the device.

10. The electronic controlling device of claim 9, wherein the plurality of modules are configured to return a global mode acknowledgement to the respective one of the plurality of global state controllers depending on a respective received global mode request.

11. The electronic controlling device of claim 7, wherein the plurality of global state controllers are configured to receive the plurality of debug module mode request signals from a chip debug system (CDS).

12. The electronic controlling device of claim 7, further comprising, coupled between at least one of the plurality of global state controllers as at least one higher hierarchical level unit and the plurality of modules as at least one lower hierarchical level unit, at least one unit at an least one intermediate hierarchical level configured to distribute and/or translate module mode request signals and mode acknowledgements between the at least one higher hierarchical unit and the at least one lower hierarchical level unit coupled to the at least one intermediate hierarchical level unit.

13. The electronic controlling device of claim 7, wherein at least one of the plurality of modules comprises a local state controller, the at least one of the plurality of modules configured to receive a plurality of global mode requests from a respective one of the plurality of the global state controllers via the local state controller.

14. A method for electronical controlling comprising:
distributing one of a plurality of system mode request signals by a device;
selecting one of a plurality of system modes by one of a plurality of global state controllers, each of the plurality of global state controllers comprising a programmable register, in reaction to the distributed system mode request signal;
distributing, by the one of a plurality of global state controllers, in a first state of the respective programmable register, a signal different from the distributed system mode request signal, and defined by the first state of the register as a module mode request signal, to a plurality of modules included in one of a plurality of clusters;
forwarding a signal corresponding to the distributed system mode request signal, and not defined by a second state of the register as module emergency mode request signal to the plurality of modules of the respective cluster in the second state of the respective programmable register; and
performing specific functions within a selected module mode on reception of the module mode request signal to the plurality of modules of the respective cluster,
wherein the plurality of system mode request signals comprise power down requests and reset requests and
wherein a plurality of debug module request signal comprising suspend requests, and
by prioritizing concurrent ones of the plurality of system mode requests and/or the plurality of debug module request signals for the plurality of modules or for the plurality of modules independently.

15. The method of claim 14, further comprising: distributing one of the plurality of debug module mode request signals by a chip debug system to the plurality of modules; and translating the distributed debug module mode request signal for the plurality of modules to a corresponding one of a plurality of module mode request signals.

16. A method for operating an electronic controlling device comprising:

clustering the electronic controlling device in a plurality of functional domains each comprising a plurality of modules, for at least one of the plurality of functional domains distributing one of a plurality of module mode request signals from one of a plurality of global state controllers to the plurality of modules within the respective functional domain, each of the plurality of global state controllers comprising a programmable register;

distributing, by a device, one of a plurality of system mode request signals to the plurality of global state controllers wherein the distributed system mode request signal is defined by the received one of the plurality of module mode request signals or by a software configurable register;

distributing, in a first state of the respective programmable register, a signal different from the distributed system mode request signal, and defined by the first state of the register as the module mode request signal, to the plurality of modules within the respective functional domain;

forwarding a signal corresponding to the distributed system mode request signal, and not defined by a second state of the register as module emergency mode request signal to the plurality of modules of the respective functional domain in the second state of the respective programmable register;

performing specific functions within a module mode on reception of the module mode request signal to the plurality of modules of the respective functional domain, wherein the plurality of system mode request signals comprise power down requests and reset requests and wherein a plurality of debug module request signal comprising suspend requests; and prioritizing concurrent ones of the plurality of system mode requests and/or the plurality of debug module request signals for the plurality of modules or for the plurality of modules independently.

17. The method of claim 16, further comprising for the at least one of the functional domains switching on or off an independent voltage regulator depending on the system mode request signal.

18. The method of claim 16, wherein the at least one of the plurality of global state controllers comprises an individually configurable priority scheme.

* * * * *